UNITED STATES PATENT OFFICE 2,277,716

FERMENTATION PROCESS FOR THE PRODUCTION OF 2-KETOGLUCONIC ACID

Lewis B. Lockwood, Alexandria, and George E. Ward, Arlington, Va., and Joseph J. Stubbs, Washington, D. C., and Edward T. Roe, Arlington, and Benjamin Tabenkin, Alexandria, Va., assignors to Henry A. Wallace, as Secretary of Agriculture of the United States of America, and to his successors in office No Drawing. Application July 8, 1940, Serial No. 344,380

7 Claims. (Cl. 195—47)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a method for the preparation of ketocarboxylic acids, and more particularly to a method for the preparation, by fermentation, of a valuable material which finds use as an intermediate for the preparation of d--isoascorbic acid (also known as d-araboascorbic acid), which possesses marked antiscorbutic and antioxidant properties. (Maurer and Schiedt, Ber. der deutsch. chem. Gesell. vol. 66, page 1054 (1933), and vol. 67, page 1239 (1934); also Ohle, U. S. Patent 2,160,621 (1939); also Dalmer and Moll, Zeitschr. physiol. Chemie, vol. 222, page 116 (1933)).

The production of 2-ketogluconic acid by fermentation methods has been only recently observed. Thus, in 1935, Bernhauer and Görlich (Biochemische Zeitschrift 280, 357) isolated small quantities of 2-ketogluconic acid from cultures of *Acetobacter gluconicum* grown on solutions of calcium gluconate, and in 1938, Bernhauer and Knobloch (Naturwissenschaften 50, 819) obtained 2-ketogluconic acid from cultures of *Acetobacter suboxydans* grown on aqueous solutions of salts of gluconic acid. In both of these cases the bacteria were grown in thin films or pellicles in unagitated surface cultures and the conversion of substrate to product required twenty days, or more. The reaction was complicated by the simultaneous formation of 5-ketogluconic acid. The formation of 2-ketogluconic acid was also dependent on the use of gluconate salts as the substrate, instead of glucose.

In contrast to the prior art we have found that if suitable bacteria are cultivated submerged in nutrient solutions containing glucose, or other suitable carbohydrates, or gluconate salts, and if the system is aerated with gases containing oxygen, such as air, at atmospheric pressure or preferably at superatmospheric pressure, the system at the same time being agitated by various means, a rapid and efficient conversion of substrate to 2-ketogluconic acid occurs. In contrast to previous mediocre yields of 2-ketogluconic acid in fermentation periods of 20 days or more, it is possible, by applying our invention, to obtain 80 to 95% yields of 2-ketogluconic acid in 30 to 40 hours. A further advantage of our invention is that we are not restricted to the use of gluconate salts as substrates, as heretofore, but we may use glucose or carbohydrate materials containing glucose as a component of the sugar molecule, such as maltose, dextrins, starch, molasses, grain mashes, and the like. A still further advantage of our invention is to be found in the fact that no 5-ketogluconic acid is formed, as has been heretofore encountered.

We have found that numerous bacteria of the genus Pseudomonas possess the ability to produce 2-ketogluconic acid from the above-mentioned substrates, when cultivated according to the methods herein set forth. Thus, we have found that many strains distributed among the following species may be used to effect this conversion: *Pseudomonas schuylkilliensis*, *Ps. putida*, *Ps. graveolens*, *Ps. vendrelli*, *Ps. ovalis*, *Ps. fragii*, *Ps. mildenbergii*, *Ps. mucidolens*, and *Ps. fluorescens*. It is thus apparent that the ability to produce 2-ketogluconic acid is characteristic of the genus Pseudomonas taken as a whole, when the bacteria are cultivated in the manner taught by us.

In our invention, agitation of the system may be effected by blowing air through the mass, or by propellers, or by revolving the fermenter, or by other means which will occur to those skilled in the art. The exact apparatus used to effect agitation is not critical, the important factor being the intimate contacting of the bacterial cells, the substrate, the neutralizing agent, and the gas used for aeration.

We have found that aeration of the mash is necessary to obtain a rapid oxidation of the substrate to 2-ketogluconic acid. Such aeration may be applied at atmospheric pressure, or preferably, at super-atmospheric pressure. We have found that operating at super-atmospheric pressure results in a more rapid conversion of substrate to product.

We have found it desirable to conduct our fermentation at temperatures between 20° C. and 50° C., the range from 25° C. to 30° C. being especially suitable.

As typical apparatus within which our process may be successfully conducted, we cite the Jena glass gas-washing bottles (type 101a) used by May, Herrick, Moyer, and Wells for the production of gluconic acid by mold fermentation [Ind. Eng. Chem. 26, 575 (1934)]; the rotary aluminum fermenters developed by Herrick, Hellbach and May for the industrial application of submerged mold fermentations [Ind. Eng. Chem. 27, 681 (1935)], and vertical vat fermenters in common use in art. We do not wish to restrict our invention as to equipment used, since numerous modifications and adaptations are possible, and will be readily apparent to those skilled in the art.

Considerable latitude is possible in the selection of nutrients to be used in performing our invention. Although we prefer to use corn steeping liquor, urea, magnesium sulfate, and potassium phosphate, as cited hereatfer in Example 1, it is possible to secure good results if some of these components are omitted or varied as to the quantity used. Thus, an entirely satisfactory fermentation may be obtained upon omitting the urea, magnesium sulfate and potassium phosphate, if the quantity of corn steeping liquor be increased. Similarly, if urea and the above-mentioned inorganic salts be supplied in the quantities given in Example 1, the corn steeping liquor may be reduced in quanity or even entirely eliminated without noticeably affecting the fermentation. We accordingly do not wish to be restricted as to the nutrient components, since many variations will be apparent to those skilled in the art. Likewise, we do not wish to be restricted as to the use of calcium carbonate as the neutralizing agent, since the substitution of quicklime, zinc carbonate, and other similar substances will readily occur to those skilled in the art.

The following examples illustrate representative procedures used in practicing our invention:

Example 1

An aqueous fermentation medium of the following composition was used:

| | Grams per liter of medium |
|---|---|
| Glucose | 100. |
| Corn steeping liquor | 5. |
| Octadecyl alcohol | 0.3 |
| Urea | 2.0 |
| MgSO$_4$.7H$_2$O | 0.25 |
| KH$_2$PO$_4$ | 0.60 |
| CaCO$_3$ | 27.0 |

3200 cc. of this sterile medium were inoculated with approximately 300 cc. of an active culture of *Pseudomonas fluorescens* and placed in a rotary drum fermenter. Air at atmospheric pressure was passed through through the fermenter at a rate of 1600 cc. per minute, the solution was agitated by revolving the drum 13 revolutions per minute, and the temperature of the system was maintained at approximately 25° C. The course of the fermentation was followed by periodic analysis. After 43 hours, the glucose was all consumed and 2-ketogluconic acid (calcium salt) was present in a quantity equivalent to a 72% yield, based on the glucose available. The product was identified by its optical properties and by preparation of the methyl ester (M. P. 174° C.).

Example 2

The same materials and conditions were used as in Example 1, except that the process was conducted under increased air pressure, a gage pressure of 30 pounds per square inch being maintained. After 25 hours, the glucose was all consumed and 2-ketogluconic acid (calcium salt) was present in a quantity equivalent to an 81% yield based on the glucose available.

Example 3

The same materials and conditions were used as in Example 2, except that calcium gluconate (50 grams per liter) was used as the substrate instead of glucose. After 65 hours, a 63% yield of 2-ketogluconic acid (calcium salt) was obtained.

Example 4

The same materials and conditions were used as in Example 2, except that potassium gluconate (50 grams per liter) was used as the substrate. After 65 hours a 61.5% yield of 2-ketogluconic acid was obtained.

Example 5

A fermentation medium of the composition given in Example 1 was distributed in 200 cc. portions of Jena glass gas-washing bottles (type 101a). Following sterilization, individual bottles were inoculated with selected species of Pseudomonas. Each bottle was then aerated for 8 days with sterile, humidified air at a rate of approximately 200 cc. per minute, the incubation temperature being 30° C. throughout. The species used, and the yields of 2-ketogluconic acid (calcium salt) obtained were as follows:

| Species: | Yield |
|---|---|
| Pseudomonas fluorescens | 70.5 |
| Pseudomonas fragii | 83.7 |
| Pseudomonas graveolens | 69.8 |
| Pseudomonas mildenbergii | 72.2 |
| Pseudomonas mucidolens | 3.8 |
| Pseudomonas putida | 75.8 |
| Pseudomonas schuylkilliensis | 60.0 |
| Pseudomonas vendrelli | 57.4 |
| Pseudomonas ovalis | 42.0 |

Example 6

32 liters of a fermentation medium of the composition given in Example 1 was sterilized in a vertical aluminum vat equipped with agitating means, and means for dispersing air. The octadecyl alcohol, supplemented by small portions of lard oil, eliminated frothing and foaming during the fermentation. The nutrient solution was inoculated with an active culture of *Pseudomonas fluorescens* and maintained at 25° C., with agitation as above described, and aeration at 12 to 16 liters of air per minute. The system was maintained at 30 pounds gage pressure. After 43½ hours the glucose was all consumed and an 88% yield of 2-ketogluconic acid (calcium salt) was obtained.

While bacteria of the genus Pseudomonas have been studied for many years, it was not known that they would produce 2-ketogluconic acid until the technique above outlined was discovered by us.

Having thus described our invention, what we claim for Letters Patent is:

1. A process for the production of 2-ketogluconic acid, which comprises inoculating a carbohydrate mash with bacteria of the genus Pseudomonas; thence aerating and agitating the inoculated mash, the while cultivating the bacteria in a submerged state, thereby producing 2-ketogluconic acid.

2. A process for the production of 2-ketogluconic acid, which comprises inoculating a carbohydrate mash with bacteria of the genus Pseudomonas, thence aerating and agitating the inoculated mash, the while maintaining the same under super-atmospheric pressure of gases containing substantial quantities of oxygen, and cultivating the bacteria in a submerged state, thereby producing 2-ketogluconic acid.

3. A process for the production of 2-ketogluconic acid, which comprises inoculating a glucose nutrient solution with bacteria of the genus Pseudomonas; thence aerating and agitating the inoculated mash, the while cultivating the bacteria in a submerged state, thereby producing 2-ketogluconic acid.

4. A process for the production of 2-ketogluconic acid, which comprises inoculating a glucose nutrient solution with bacteria of the genus Pseudomonas, thence aerating and agitating the inoculated mash, the while maintaining the same under superatmospheric pressure of gases containing substantial quantities of oxygen, and cultivating the bacteria in a submerged state, thereby producing 2-ketogluconic acid.

5. A process for the production of 2-ketogluconic acid, which comprises inoculating a nutrient solution containing a gluconate salt with bacteria of the genus Pseudomonas; thence aerating and agitating the inoculated mash, the while cultivating the bacteria in a submerged state, thereby producing 2-ketogluconic acid.

6. A process for the production of 2-ketogluconic acid, which comprises inoculating a nutrient solution containing a gluconate salt with bacteria of the genus Pseudomonas, thence aerating and agitating the inoculated mash, the while maintaining the same under super-atmospheric pressure of gases containing substantial quantities of oxygen, and cultivating the bacteria in a submerged state, thereby producing 2-ketogluconic acid.

7. A process for the production of 2-ketogluconic acid, which comprises inoculating a carbohydrate mash with bacteria of the group consisting of the species *Pseudomonas fluorescens, Ps. fragii, Ps. graveolens, Ps. mildenbergii, Ps. mucidolens, Ps. putida, Ps. schuylkilliensis, Ps. vendrelli,* and *Ps. ovalis;* thence aerating and agitating the inoculated mash, the while cultivating the bacteria in a submerged state, thereby producing 2-ketogluconic acid.

LEWIS B. LOCKWOOD.
GEORGE E. WARD.
JOSEPH J. STUBBS.
EDWARD T. ROE.
BENJAMIN TABENKIN.